Patented Oct. 4, 1938

2,132,077

UNITED STATES PATENT OFFICE 2,132,077

METHOD OF MAKING BLUE-VEINED CHEESE

Clarence B. Lane and Bernard W. Hammer, Ames, Iowa, assignors to Iowa State College Alumni Association, Incorporated, Ames, Iowa, a corporation of Iowa No Drawing. Application November 14, 1936, Serial No. 110,926

3 Claims. (Cl. 99—116)

Our invention relates to a method of making blue-veined cheese.

It involves particularly properly homogenizing the milk, preferably the cooking of the curd and certain other departures from the steps heretofore practiced in making this type of cheese.

It is our purpose to provide a method for making blue-veined cheese, which will improve the color, facilitate the mold growth, produce a uniformity in quality, shorten the time for ripening, and afford a product of improved flavor.

The Roquefort type cheese has been made for a considerable number of years in Europe. The attempts to duplicate the manufacturing process and produce a successful product in the United States have thus far been only partially successful and have not resulted in the establishment of a blue-veined cheese industry.

The difficulties usually encountered are

1. The long time required for the cheese to develop the flavor which is characteristic of Roquefort type cheeses and the failure to get this flavor uniformly.

2. The mold growth in successive lots of cheese has not been uniform.

3. The general quality of the cheese has varied considerably in successive lots.

4. The color of the curd has been too dark to meet critical markets.

In the case of foreign manufacture, it is probably true that the product has not been uniform and that the more desirable lots of cheese are exported from those countries, and the poorer cheese is kept locally where it is utilized. In this country, however, such a situation cannot prevail since there would be no ready market for the poorer quality of cheese.

No commercial process up to the present has been developed by which blue-veined cheese could be produced and marketed satisfactorily, having uniformly the qualities required in this kind of cheese, except those newly developed factories which are using the methods herein described.

American manufacturers are not interested in a process which involves keeping cheese in storage for ripening say for relatively long periods (ten to twelve months). The public cannot be depended upon to buy a brand of cheese which varies as to flavor or color or general quality.

The failure of the mold to develop properly results in a cheese which does not have the desired appearance and also usually is lacking in the characteristic flavor.

Research has discovered that the sharp peppery characteristic Roquefort flavor is due at least in considerable part to the accumulation of caproic, caprylic and capric acids and their easily hydrolyzable salts during the ripening of the cheese. Presumably these products result from the hydrolysis of some of the fat by lipolytic enzymes of the milk and the normal mold of the cheese.

It has always been the practice to use unhomogenized milk in the making of this type of cheese.

We have discovered that by properly homogenizing the milk at certain temperatures and pressures, and by preferably following certain other steps slightly differing from those ordinarily used, we are able to produce Roquefort cheese of the proper color.

The mold growth is more luxurious and has the brilliant green, which is desirable.

Cheese made by our method ripens very rapidly so that it can be marketed after only a few months. The characteristic flavor is secured and above all a product with the proper qualities can be produced with uniformity by this method.

Heretofore homogenized milk has been used only for making cream cheese. Homogenized milk has never, so far as we know, been used or attempted to be used for making blue-veined or Roquefort type cheese.

Experiments have been made with homogenized milk in the making of certain kinds of cheese, which are ripened or cured (Swiss and brick) but where tried heretofore the use of homogenized milk gave unsatisfactory results. Hence the use of homogenized milk in the making of cured cheese has been considered out of the question.

However, we have found that homogenized milk can be successfully used as above stated in making blue-veined cheese. We found that it is necessary to depart somewhat from the steps heretofore employed in making blue-veined cheese and we here note these departures.

In the former methods of making blue-veined cheese, the milk has not been treated. We found it desirable to homogenize the milk.

We also departed somewhat from the commonly used practices in homogenizing milk in the matter of temperature and pressure, and have secured the best results, for example, by using a two-stage homogenizer at 2500 plus 500 pounds pressure at 95° Fahrenheit temperature.

The homogenizing of milk, as is well known, breaks up the large fat globules into many small ones, thereby increasing the total surface area of the globules. Thereupon the lipases are able to act more quickly on fat to produce the free fatty acids as mentioned above. This means that the process of ripening can be very greatly shortened, since the products of fat hydrolysis are necessary to provide the characteristic Roquefort flavor.

Instead of homogenizing the milk as above explained the same maximum fat hydrolysis may be had by separating the cream from the milk, homogenizing the cream, and then adding this homogenized cream to the skim milk, and using the resulting mixture or by adding homogenized cream or butter to the milk used for cheese making.

However, we found, as have other investigators, that when homogenized milk is attempted to be used in the manufacture of blue-veined cheese, other difficulties arise.

It should perhaps first be mentioned that we have made some modification in the usual process of homogenization. Ordinarily homogenization is practiced at a temperature so high as to render ineffective the lipases. We have found that this destructive effect begins at about 100° and is substantially complete at 117° Fahrenheit.

Therefore, in order to get the best results, we have found that the milk must be homogenized at a temperature below 100° and we have had very satisfactory results at 95°.

We have found that results can be had with temperatures through a range from 80° to 100° without interfering with the action of the inherent milk lipases. We got excellent results at the pressure mentioned above, but we believe better results can be had with a pressure ranging from 2000 to 3500 pounds.

We further found that the homogenization of the milk affected the curd, so that when the milk was coagulated with the amount of rennet usually considered proper, the resulting curd was relatively soft and brittle, which as the cheese manufacturing process continued became a mushy mass, practically impossible to handle, and producing a very poor and abnormal cheese.

It might be said that we further found that whereas the ripening period prior to the addition of rennet has formerly been from twenty to thirty minutes, we had better results by using forty to fifty minutes.

We have already mentioned how homogenization affects the curd. We have discovered that this difficulty could be cured and a very fine curd produced, if, instead of the usual amount of rennet (3 ounces per 1000 pounds of milk), we substantially increased the amount of rennet used, and employed 4 ounces of rennet per 1000 pounds of milk.

We also discovered that in setting the milk with the rennet, we got better results at 90° to 92° Fahrenheit instead of the temperature ordinarily used, to-wit 85° to 86° Fahrenheit.

From here on, we found that our process clearly speeded up the making of cheese. For instance, whereas heretofore, cutting was done 90 minutes to 120 minutes after setting, we could do the cutting where our method was employed, 35 to 40 minutes after setting.

We also found that whereas under previous methods, dipping was done sixty to ninety minutes after cutting, when the high acidity is reached in the whey (.2 to .21 percent acid calculated as lactic). With our method, dipping could be done 35 to 45 minutes after cutting— the acidity of the whey is relatively low (.15 to .17 percent acid calculated as lactic).

We discovered also that where homogenized milk is used that it is desirable after the dipping to cook the curd to 93° to 95° Fahrenheit by the addition of hot whey.

We found that the draining time on the cloth could be reduced from the normal time of from twenty to thirty minutes, heretofore employed, to a short time of from three to five minutes.

Whereas under the former method, the mold powder has been dusted on the layers of curd in the hoop, we have produced the best result by mixing the mold powder into the curd on the drain cloth.

In practicing the method heretofore employed, the hoops have been turned about every half hour for four hours, whereas in our method, the hoops may be turned every fifteen minutes for four hours.

Salting is done in the ordinary way.

Whereas under former methods, the cheese required from eight to ten months for curing, a cheese made by our method can be ripened in from two to four months.

In the finished product, we find that whereas Roquefort cheese heretofore manufactured in this country has been relatively dark (yellow), the cheese made by our method has the light color which compares favorably with imported Roquefort.

We have found that where our method is employed, the mold growth is more luxuriant and has a brilliant green color, as compared with the less luxuriant grey green color of cheese made by commercial processes heretofore.

One of the chief objections to Roquefort cheese attempted to be made for commerce heretofore in this country has arisen from the fact that it was very difficult to produce successive batches of uniform quality. One batch might be fairly good and the next one would be very poor, and no one has been able to determine why.

We find, however, that with our method the successive batches are of uniform high quality.

In the practice of our process, we have taken advantage of the known fact that homogenization breaks up large fat globules into small ones, thereby increasing the total surface area of the globules. Investigators have shown that the characteristic flavor of blue-veined cheese is brought about largely by the production of certain free fatty acids mentioned above, to-wit,— caproic, caprylic and capric acids during the ripening of the cheese. These acids originate primarily from the milk fat which is broken down or hydrolyzed (a) By the inherent lipases (fat hydrolyzing enzymes) in the milk, and (b) By additional lipases produced by mold.

When there is a proper accumulation of these free fatty acids in the cheese, the characteristic sharp peppery flavor associated with blue-veined cheeses occurs.

The use of homogenized milk with a greater number of fat globules having a substantially increased surface area (over normal milk) makes it possible for the lipases to act more quickly on the fact to produce free fatty acids.

It is probable that homogenized milk has not heretofore been used in part at least because of the accepted belief that homogenized milk gives a bad flavor and a bad texture to cured cheeses. We have found, however, that where our method is employed, satisfactory blue-veined cheese approximately very closely the best imported product can be uniformly secured.

We claim as our invention:

1. A method of making blue-veined cheese which involves the homogenizing of the milk intended for cheesemaking at a temperature below 110° F. to prevent the destruction and inhibition of the activity of inherent milk lipases and at a pressure of 1000 to 4000 pounds per square inch to materially break up the fat globules, setting the milk at 90° F. with four ounces of rennet per 1,000 pounds of milk, cutting the curd after approximately one hour, cooking the curd to 92° F. by the addition of hot whey; dipping the curd and the mixing in of mold powder; and completing hooping the curd, salting the cheese and ripening it.

2. A method of making blue-veined cheese which involves the separation of whole milk intended for cheesemaking into skim milk and cream; treating the cream with a homogenizing process by which the fat globules are broken up into smaller units than they exist in normal cream and then recombining the skim milk and cream after which the mixture is made into blue-veined cheese.

3. A method of making blue-veined cheese which involves the homogenization of the milk fat intended for cheese making at a temperature below 110° F. to prevent the destruction and inhibition of the activity of inherent milk lipases, and at a pressure of 1000 to 4000 pounds per square inch to materially break up the fat globules after which the milk fat is made into blue-veined cheese.

CLARENCE B. LANE.
BERNARD W. HAMMER.

DISCLAIMER 2,132,077.—*Clarence B. Lane* and *Bernard W. Hammer*, Ames, Iowa. METHOD OF MAKING BLUE-VEINED CHEESE. Patent dated October 4, 1938. Disclaimer filed May 31, 1943, by the assignee, *Iowa State College Research Foundation*.

Hereby disclaims claim 3 of said patent.

[*Official Gazette June 29, 1943.*]

which involves the homogenizing of the milk intended for cheesemaking at a temperature below 110° F. to prevent the destruction and inhibition of the activity of inherent milk lipases and at a pressure of 1000 to 4000 pounds per square inch to materially break up the fat globules, setting the milk at 90° F. with four ounces of rennet per 1,000 pounds of milk, cutting the curd after approximately one hour, cooking the curd to 92° F. by the addition of hot whey; dipping the curd and the mixing in of mold powder; and completing hooping the curd, salting the cheese and ripening it.

2. A method of making blue-veined cheese which involves the separation of whole milk intended for cheesemaking into skim milk and cream; treating the cream with a homogenizing process by which the fat globules are broken up into smaller units than they exist in normal cream and then recombining the skim milk and cream after which the mixture is made into blue-veined cheese.

3. A method of making blue-veined cheese which involves the homogenization of the milk fat intended for cheese making at a temperature below 110° F. to prevent the destruction and inhibition of the activity of inherent milk lipases, and at a pressure of 1000 to 4000 pounds per square inch to materially break up the fat globules after which the milk fat is made into blue-veined cheese.

CLARENCE B. LANE.
BERNARD W. HAMMER.

DISCLAIMER 2,132,077.—*Clarence B. Lane* and *Bernard W. Hammer*, Ames, Iowa. METHOD OF MAKING BLUE-VEINED CHEESE. Patent dated October 4, 1938. Disclaimer filed May 31, 1943, by the assignee, *Iowa State College Research Foundation*.

Hereby disclaims claim 3 of said patent.

[*Official Gazette June 29, 1943.*]